W. A. UTTZ.
AUTOMATIC STOPPAGE AND OCCUPANT PROTECTING EQUIPMENT FOR AUTOMOBILES.
APPLICATION FILED JUNE 16, 1917.

1,256,848.

Patented Feb. 19, 1918.
3 SHEETS—SHEET 1.

INVENTOR
Wm. A. Uttz
BY
George F. Thorpe
ATTORNEY

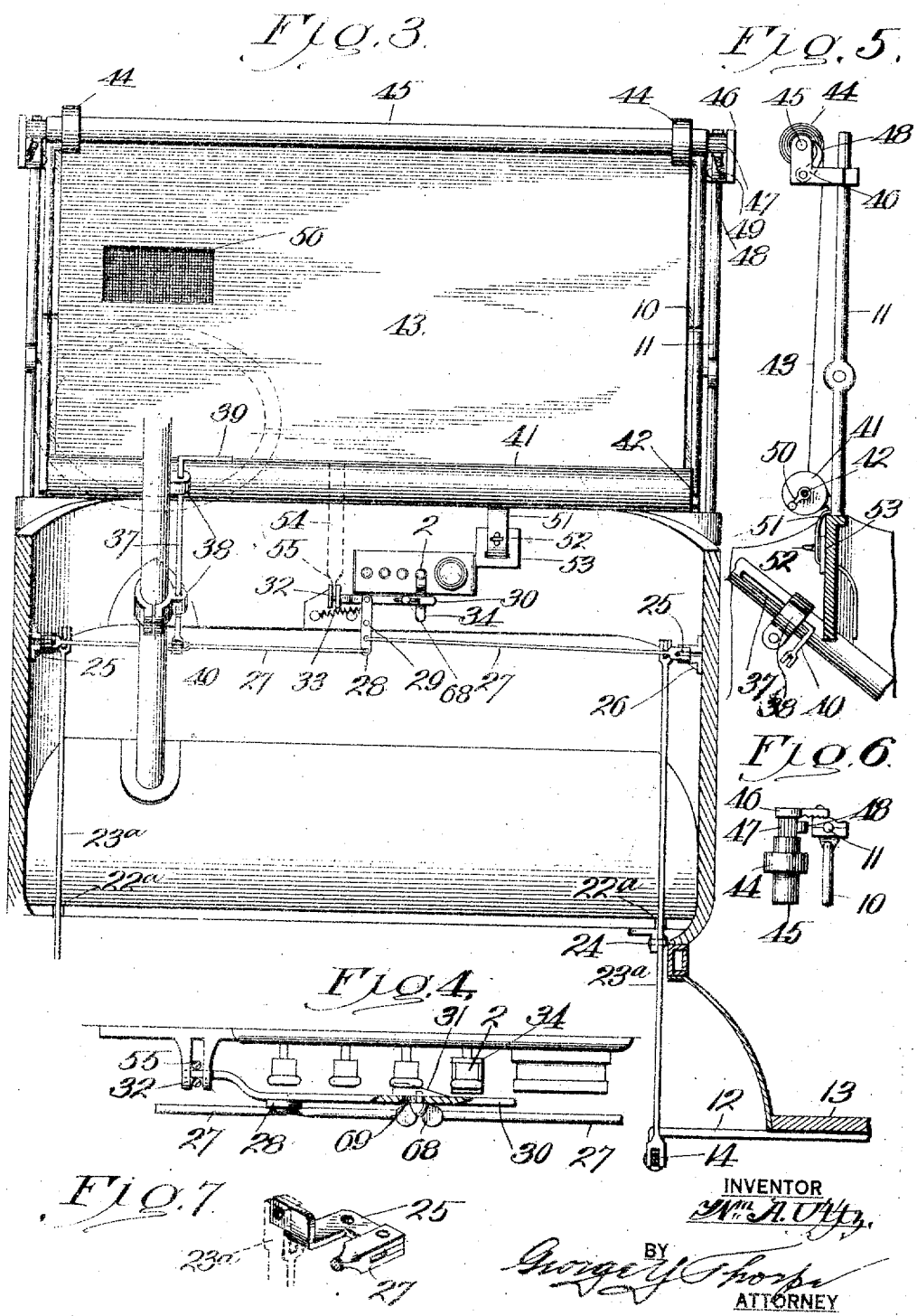

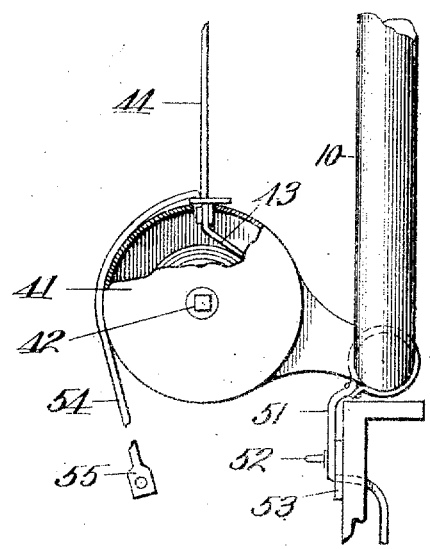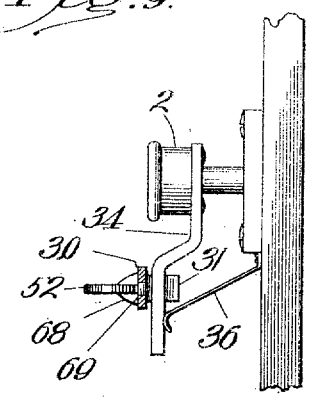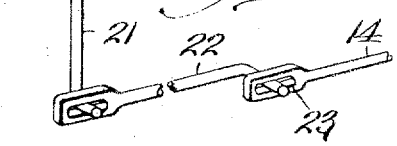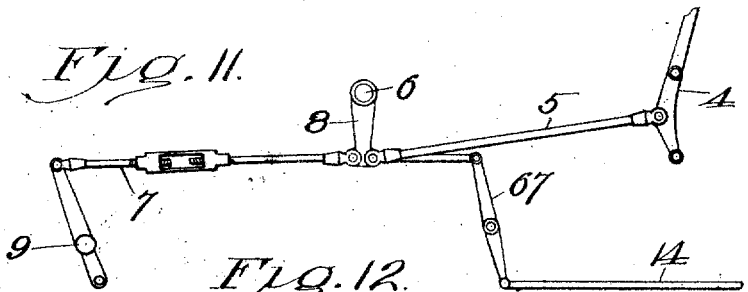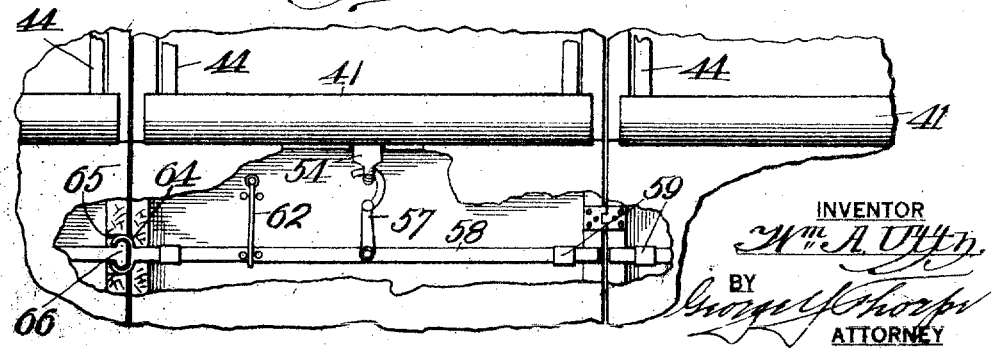

UNITED STATES PATENT OFFICE.

WILLIAM A. UTTZ, OF KANSAS CITY, MISSOURI.

AUTOMATIC STOPPAGE AND OCCUPANT-PROTECTING EQUIPMENT FOR AUTOMOBILES.

1,256,848.  Specification of Letters Patent.  Patented Feb. 19, 1918.

Application filed June 16, 1917. Serial No. 175,538.

*To all whom it may concern:*

Be it known that I, WILLIAM A. UTTZ, a citizen of the United States, residing at Kansas City, in the county of Jackson and State of Missouri, have invented certain new and useful Improvements in Automatic Stoppage and Occupant-Protecting Equipments for Automobiles, of which the following is a specification.

This invention relates to automatic stoppage and occupant protecting equipment for automobiles, and the primary object is to provide means actuated by repression of the front bumper bar of a car, to open the ignition circuit, apply the brakes of the car and effect the interposition of a curtain between the wind shield and occupants of the car and setting of additional curtains along the sides of the car as a protection against glass or the like flying into the car as a result of the collision. Another object is to provide means whereby the protecting curtains of the side of the car nearest the point of collision shall be set in operative position in the event the bumper bar is repressed only at the end nearest such side.

Another object is to produce equipment of the character specified above which will operate efficiently and reliably, is of simple, strong, durable and inexpensive construction, and which can be easily and economically applied to any type of motor car, without interfering with the normal and ordinary manual control of the parts of the automobile automatically operated through the instrumentality of the equipment.

With these objects in view, the invention consists in certain novel and peculiar features of construction and combination of parts as hereinafter described and claimed; and in order that it may be fully understood reference is to be had to the accompanying drawings, in which:

Fig. 3, is a cross section on an enlarged scale of the car showing the dash from the inside.

Fig. 4, is an enlarged plan view of a part of the mechanism shown by Fig. 3.

Fig. 5, is a side view of the wind shield protecting equipment with the instrument board in section.

Fig. 6, is a plan view of a part of the construction shown by Fig. 5.

Figs. 7 and 8, are detail perspective views of parts of the invention.

Fig. 9, is an edge view of the ignition push button operating mechanism.

Fig. 10, is an enlarged detail view of a part of one of the protecting devices.

Fig. 11, is a side view of a modified construction of part of the equipment.

Fig. 12, is a view of a modification of another part of the equipment.

Figure 1:
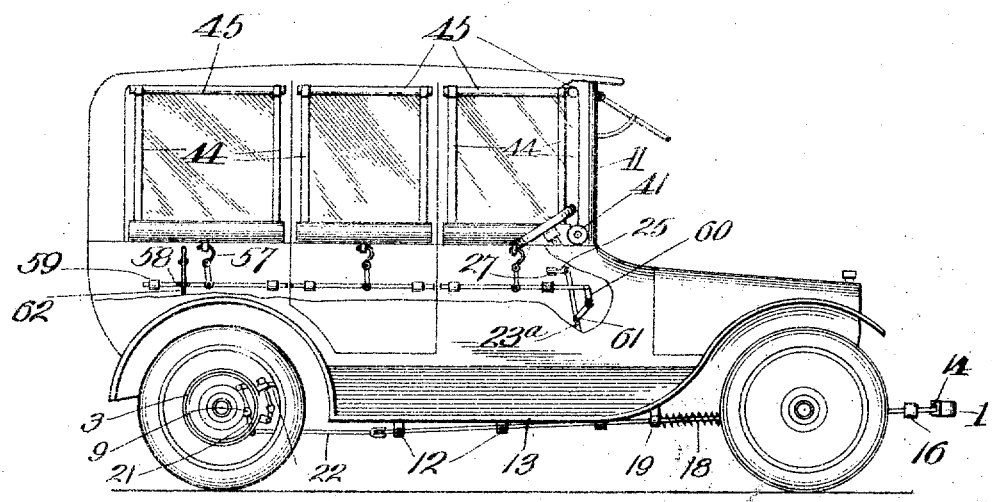
Figure 1, is a side view of a motor car provided with equipment embodying the invention.

Referring now to the drawings, where like reference characters identify corresponding parts in all of the figures, 1 indicates the customary yieldingly advanced bumper bar, 2 the push button by which the ignition circuit is broken, 3 the brakes, 4 the emergency lever, 5 a rod for actuating the rock shaft 6, and 7 the rods connecting crank arms 8 of rock shaft 6 with the rock shafts 9, for effecting the application of the brakes.

10 indicates the wind shield and 11 the frame thereof. All of the parts above referred to are common in motor car construction and are represented herein as found in the Light Buick Six.

To effect the automatic shutting down of the engine, emergency application of the brakes and adjustment of curtains to protective position behind the wind shield and at the sides of the car, certain mechanism described below is provided, attention being called in this connection to the wind shield protector Patent No. 1186865, of June 13, 1916, of which the wind shield curtain features of this application represent merely structural improvements and refinements.

Slidably mounted in brackets 12, underlying and secured to the running boards 13 of the car, are rods 14, the same extending alongside and outward of the front springs of the car (not shown) and through guide brackets 16 mounted on the bumper bar supports 17. The front ends are in the horizontal plane of the bumper bar and in close proximity or juxtaposed relation thereto so that slight rearward movement thereof shall force said rods backward against the resistance of spring 18, mounted on the rods and bearing at their rear ends against fixed brackets 19, of the car, and collars 20 on the rods, the said springs advancing their respective bars to normal position the instant the bumper bar returns to normal position. In this connection it will be noted that while the rods may be repressed simultaneously as explained, they are independently mounted and hence either one may be forced rearward independently of the other in the event only one end of the bumper bar is repressed. The rearward movement of either rod effects the breaking of the ignition circuit, application of the brakes and the setting of the protective curtains, as will hereinafter appear.

The rock shafts 9 are provided with depending arms 21, to which are pivotally attached the rear ends of extension 22 of rods 14, the extensions 22 having a pivotal pin and slot connection at 23 with the rear ends of said rods to accommodate the up and down movements of the car frame, incidental to the passage of the wheels over irregular surfaces of the road. In this connection it will be noted that the backward thrust of the rods against the depending arms 21, will effect the application of the brakes, and through the standard connections hereinbefore enumerated, will swing the emergency lever rearward exactly as though thrown by hand, it being noted in this connection that the lever is free for manual operation when desired, as the thrust rods are not rigidly connected to the bumper bar. When the lever is returned to normal position to release the brakes, the thrust rods are automatically readvanced, by their respective springs 18.

Extending through slots 22ª in the floor and near each side of the car forward of the fore doors thereof, is a pair of levers 23ª, fulcrumed on brackets 24 secured to the car and pivoted at their lower ends to the respective thrust rods. The upper ends of the levers have pin and slot connections with horizontal bell cranks 25 mounted on brackets 26 secured to the car, and said bell cranks are pivotally connected by links 27 to the lower end of a lever 28 pivoted at 29 to the instrument board, and the upper end of said lever is pivotally connected to a horizontal transversely extending bolt 30 mounted in suitable guides and provided at its front side with a cam 31, and its left end is held normally extending through a bifurcated bracket 32 for a purpose which hereinafter appears, by a retractile spring 33. The cam at such time, is to the left of a vertical plate 34 connected to the ignition push button 2, said plate being held pressed rearward by a spring 36. The arrangement is such that when the slide bar 30 is moved to the right, said cam 31 engages plate 34 and forces the same forward and thereby opens the ignition circuit and stops the operation of the engine. The same operation can be accomplished manually by means of a shaft 37 journaled in arms 38 on the steering column, said shaft having a handle 39 just below the steering wheel and therefore convenient to the driver of the car, and a crank arm 40 having a pin and slot connection with the adjacent link 27.

The operation of the handle 39 is performed not only to close the ignition circuit but to effect the setting of the protector curtain for the wind shield, hereinafter described, and the side windows of a limousine, as shown by Fig. 1. The curtain protectors used back of the wind shield and at the inner sides of the windows of a limousine, are of identical construction so that a description of the one applied to the wind shield will be understood to likewise apply to the side curtains, it being noted that certain small parts illustrated in Figs. 3, 5 and 6, are omitted for purposes of clearness in Fig. 1.

The wind shield illustrated is of a common and well-known type, and secured to the lower rail of the lower member of the wind shield in any suitable manner is a slotted cylindrical casing 41, and journaled in and extending through said casing is a shaft 42 to which the lower edge of a curtain 43 is attached, the upper edge of the curtain being attached to the lower ends of a pair of straps 44. The upper ends of said straps are secured to a spring roller 45 journaled in an angle bracket 46, secured to the frame 11 of the wind shield, and said spring roller is equipped at one or both ends with a ratchet wheel 47 and a pawl 48 to be held in engagement with said ratchet wheel by a spring 49 to guard against unwinding of the curtain from the spring roller in the event an occupant of the car is thrown forward under sudden arrest of the car, the curtain in this case protecting such person from being injured by the wind shield.

When the curtain is in operative or protecting position it is stretched across the wind shield at the inner side of the same as shown in Figs. 3 and 5, the straps 44 being wound upon the spring roller. To rewind the curtain upon the shaft 42 from which it is unwound by the spring roller to operative position, one end of shaft 42 may be equipped with a small crank handle 50, it being understood that preliminarily the pawls must be tripped and held from operation during the rewinding operation. Normally the curtain is wholly wound upon the shaft 42 within the cylindrical casing or housing 41, and the straps 44 extend from the casing to the spring roller, as seen in Fig. 1. When the parts are in this normal condition, the tendency of the spring roller is to pull the curtain upward and hence swing the lower member of the wind shield inwardly. To guard against this eventuality, a perforated strap 51 is secured to the lower end of said member of the wind shield and engaged by a turn button 52 projecting from a slotted plate 53 secured to the instrument board, the slot in the plate 52 registering with a slot (not shown) in said board, so that the free end of the strap 51 can be threaded through the instrument board and be out of the way. The strap will be provided with a series of perforations to permit of adjustment to accommodate the lower wind shield member in different positions.

To overcome the resistance of the spring roller and hold the curtain normally open, that is wound upon the shaft 42, the upper edge of the curtain is provided about midway its length with a short depending strap 54 terminating in a perforated tongue 55 to engage the bifurcated bracket 32 on the instrument board, and the reduced end of the bolt 30, so as to exert a lateral pull on said bolt. When the bolt moves endwise to the right through manual power or otherwise as explained, it is withdrawn from engagement with tongues 55 of strap 54, and the instant this occurs, the spring roller operates and raises the curtain to protective position. If desired the curtain may be provided with a small window 56 of very fine mesh to enable the driver to see directly in front while protecting him from injury from flying glass.

In Fig. 1, the strap 54 for each curtain is engaged by a hook 57 arranged within and pivoted to the side of the car in any suitable manner, one of said hooks being shown as applied to the inside of a door. The lower ends of the hooks are preferably connected loosely with longitudinally alined rods 58 mounted in guides 59 secured to the side of the car and door, and said rods are alined so that when the front one is slid rearwardly, it will impart like movement to the intermediate one and through the same to the rear one. As a result the hooks are simultaneously operated and the curtains are released for automatic closure. Any suitable means may be employed to operate each set of alined rods, that shown being a bell crank 60 pivotally connected to the front end of the foremost rod and at 61 to the adjacent lever 28ª, the pivotal connections being sufficiently loose to accommodate the arcs through which the bell cranks and lever swing, and to return the rods not connected to bell cranks 60, to normal position, the rearmost one of each set is connected to a spring 62 mounted on the adjacent side of the car, the springs yielding to actuation of the bumper and reacting to return the said rods when the bumper is readvanced.

In Fig. 12, a modification is shown involving an interlocked connection between the rearmost rod 58 and the adjacent rod 58 upon the door of the car, the arrangement being such that the last named rod will pull the other one back to normal position, without however, interfering with the opening and closing of the door. As shown, the rod 58 on the door has a C-shaped head 64, within which extends the adjacent end of the rearmost rod, the latter having an elliptic head 65, the head 64 being adapted for sliding rearward and to swing laterally through the opening to accommodate the door movements, without affecting head 65, which it reengages when the door is closed.

Figure 2:
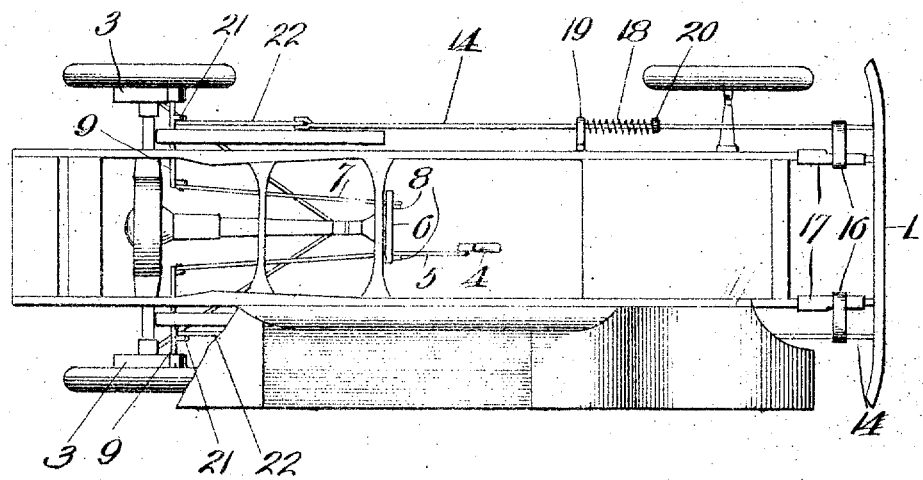
Fig. 2, is a plan view of the car with the body omitted and showing only the parts directly affected by or in physical connection with the equipment.

Fig. 11 illustrates a modification of the thrust rods (one only being shown), showing how they may be connected to a rock shaft 67, and the latter be linked to the depending arm of the usual rock shaft for actuating the brake mechanism. This construction dispenses with certain features shown in Figs. 1 and 2, and possesses advantages over the latter in the way of simplicity, strength and ease of attachment.

As the operation and function of the various parts has been set forth in connection with the detail description thereof, recapitulation of the operation in detail is not necessary, other than to state that the cam 31 is clamped to slide bolt 30 by a wing nut 68 extending through a slot 69 in said bolt, so that in the event the car is stopped in such a manner that the bumper bar cannot return to normal position because of the object by which it was repressed, it will be impossible to reclose the ignition circuit until the car is either first pushed back from such object to permit the bumper to be readvanced, or the cam is withdrawn to permit the ignition button to be pulled back to normal position.

From the above description it will be apparent that I have produced an automatic stoppage and occupant protecting equipment for automobiles, embodying the features enumerated as desirable, and while I have illustrated and described the preferred type of construction it is to be understood that I reserve the right to make such changes in form, proportion, detail construction and arrangement of the parts as fall within the spirit and scope of the appended claims.

I claim:

1. The combination in a motor car, of an ignition circuit breaking device, a brake operating device, a protecting curtain, a spring-actuated roller, flexible connections between the roller and the curtain, means for holding the curtain in inoperative position, a bumper, and means actuated by repression of the bumper for operating the ignition circuit breaking and brake-operating devices and releasing the curtain holding means.

2. The combination in a motor car, of an ignition circuit breaking device, a brake operating device, a protecting curtain, a spring-actuated roller, flexible connections between the roller and the curtain, means for holding the curtain in inoperative position, a bumper, thrust rods for conjoint or independent rearward movement by the bumper, and means for transmitting power from the thrust rods to operate the ignition circuit breaking and brake operating devices and release the curtain holding means.

3. The combination in a motor car, of an ignition circuit breaking device, a brake operating device, a protecting curtain, a spring-actuated roller, flexible connections between the roller and the curtain, means for holding the curtain in inoperative position, a bumper, thrust rods for conjoint or independent rearward movement by the bumper, means for transmitting power from the thrust rods to operate the ignition circuit breaking and brake operating devices and release the curtain holding means, and independent means for restoring each thrust rod and the ignition circuit breaking and brake operating devices to normal position.

4. The combination in a motor car, of an ignition circuit breaking device, a brake operating device, a protecting curtain, a spring-actuated roller, flexible connections between the roller and the curtain, means for holding the curtain in inoperative position, a bumper, thrust rods for conjoint or independent rearward movement by the bumper, means for transmitting power from the thrust rods to operate the ignition circuit breaking and brake operating devices and release the curtain holding means, independent means for restoring each thrust rod and the ignition circuit breaking and brake operating devices to normal position, and means to restore the curtain to normal or inoperative position.

5. The combination in a motor car, of an ignition circuit breaking device, a brake operating device, a protecting curtain, a spring-actuated roller, flexible connections between the roller and the curtain, means for holding the curtain in inoperative position, a bumper, means actuated by repression of the bumper, for operating the ignition circuit breaking and brake operating devices and releasing the curtain holding means, and manually-operable means to operate the means for operating the ignition circuit breaking and brake operating devices and releasing the curtain holding means.

6. The combination in a motor car, of an ignition circuit breaking device, a brake operating device, a protecting curtain, a spring-actuated roller, flexible connections between the roller and the curtain, means for holding the curtain in inoperative position, a bumper, and manually-operable means for operating the ignition circuit breaking and brake operating devices and releasing the curtain holding means.

7. The combination in a motor car, of an ignition circuit breaking device, a protecting curtain, a spring-actuated roller, straps connecting the roller with the curtain, means for holding the curtain in inoperative position, a bumper, and means actuated by repression of the bumper for operating the ignition circuit breaking device and releasing the curtain holding means.

8. The combination in a motor car, of a brake operating device, a protecting curtain, a spring-actuated roller, straps connecting the roller with the curtain, means for holding the curtain in inoperative position, a bumper, and means actuated by repression of the bumper for operating the brake operating device and releasing the curtain holding means.

9. The combination in a motor car, of an ignition circuit breaking device, a roller, a protecting curtain wound upon said roller, a spring actuated roller, straps connecting the last-named roller with the curtain, means to prevent the spring actuated roller from unwinding the curtain from the first-named roller, a bumper, and means actuated by repression of the bumper for operating the ignition circuit breaking device and releasing the spring roller restraining means.

10. The combination in a motor car, of an ignition circuit breaking device, a roller, a protecting curtain wound upon said roller, a spring actuated roller, straps connecting the last-named roller with the curtain, means to prevent the spring actuated roller from unwinding the curtain from the first-named roller, a bumper, and manually operable means for operating the ignition circuit breaking device and releasing the spring roller restraining means.

11. The combination in a motor car, of an ignition circuit breaking device, a brake operating device, a wind shield protecting curtain and side window protecting curtains, rollers for holding the curtains wound to leave the wind shield and windows exposed, a spring-actuated roller for the wind shield and each window, straps connecting each curtain with the companion spring-actuated roller, means for restraining the spring actuated rollers from operating their respective curtains, and means for operating the ignition circuit breaking and brake operating devices and releasing the roller restraining means.

12. The combination in a motor car, of an ignition circuit breaking device, a brake operating device, a wind shield protecting curtain and side window protecting curtains, rollers for holding the curtains wound to leave the wind shield and windows exposed, a spring-actuated roller for the wind shield and each window, straps connecting each curtain with the companion spring-actuated roller, means for restraining the spring-actuated rollers from operating their respective curtains, a bumper, means actuated by repression of the bumper for operating the ignition circuit breaking and brake operating devices and releasing the spring roller restraining means.

13. In a motor car, a series of longitudinally-alined rods slidingly arranged on the car, one of the rods being mounted on a door and interlocked at the free edge of the door with the adjacent end of another of the rods, as regards longitudinal or sliding movement but detachable from said other rod as regards movement induced by outward or opening movement of the door and interlocked with said other rod through closure of the door, means holding said rods yieldingly in one position of their longitudinal or sliding movement, and bumper-actuated means for overcoming the resistance of the said holding means and imparting sliding movement to said rods.

14. In a motor car, the combination of a series of longitudinally-extending and alined rods slidingly arranged on the car, one of the rods being mounted on a door and movable therewith in the opening and closing movements thereof and detachable at the free edge of the latter from the adjacent end of another rod when the door is opened or closed, but movable with said other rod in a longitudinal direction when the door is closed, means for holding the series of rods at one limit of their slidable movement, a series of curtains connected to said rods, bumper-actuated means for imparting sliding movement to the rods to break the connection between the same and said curtains, and means to spread the curtains as said connections are broken.

15. In a motor car, a series of longitudinally alined rods slidingly arranged on a side of the body of the car, one of said rods being carried by a door and provided with a C-shaped head normally occupying a cavity in the body against the free edge of the door, and the rod on the body adjacent the free edge of the door having an elliptic head normally fitting in said C-shaped head, means holding said rods yieldingly in one position of adjustment, and bumper actuated means for effecting conjoint endwise movement of said rods.

In testimony whereof, I affix my signature.

WILLIAM A. UTTZ.